Patented Feb. 8, 1949

2,460,975

UNITED STATES PATENT OFFICE 2,460,975

RECOVERY OF MOLYBDENUM COMPOUNDS

Michael C. Carosella, Niagara Falls, N. Y., assignor to United States Vanadium Corporation, a corporation of Delaware No Drawing. Application December 28, 1944, Serial No. 570,219

6 Claims. (Cl. 23—51)

This invention relates to the preparation and recovery of molybdenum compounds from ore materials and aqueous solutions containing both molybdenum and tungsten compounds.

Molybdenum and tungsten frequently occur together in ore deposits. Some ores contain readily separable tungsten and molybdenum minerals, but there are large quantities of ores in which the tungsten and molybdenum minerals are not so readily separable. For example, in some scheelite ores molybdenum is present as an isomorphic replacement of tungsten. Because of the difficulty of separating tungsten and molybdenum minerals from each other in this type of ore by ordinary mechanical methods of concentration, ore of this kind is subjected to chemical treatment to dissolve both molybdenum and tungsten therefrom. This treatment produces an aqueous solution containing both molybdenum and tungsten compounds, and the solution must then be treated to recover separately molybdenum and tungsten compounds. Similar solutions result from the treatment of molybdenum-bearing scrap in which molybdenum is contaminated by associated tungsten values.

It is the principal object of the present invention to provide an economical and efficient process for recovering a molybdenum compound from an aqueous solution containing both molybdenum and tungsten compounds. More specifically, it is an object of the invention to produce, from a solution containing both molybdenum and tungsten compounds, particularly a solution in which molybdenum compounds predominate, a molybdenum compound, substantially free from tungsten, which is useful without further treatment and which may be readily converted to other molybdenum compounds.

These objects are attained by the invention which is a process comprising the steps of adjusting the pH of an aqueous solution of molybdenum and tungsten compounds to a value between about 5 and 7.5, preferably between 5 and 7, by the appropriate addition of a mineral acid or an alkali, and then adding to the solution a mineral acid salt of a divalent metal selected from the group consisting of iron, cobalt, nickel and manganese. For economy and convenience, ferrous sulfate is a preferred salt. Under these conditions there is precipitated from the solution a molybdate of the selected metal substantially free from tungsten compounds. Preferably, to promote separation of the molybdate from solution by filtration the solution is heated, say to a temperature between about 75° C. and its boiling point during the metal salt addition.

For example, an alkaline solution containing sodium tungstate and sodium molybdate, prepared for instance by digesting an ore containing molybdenum and tungsten minerals with a hot aqueous solution of an alkali metal compound such as sodium carbonate or sodium hydroxide having a strong basic reaction at a pressure of about 130 to 200 pounds per square inch (temperature about 180° C. to 198° C.), is treated with a mineral acid such as sulfuric acid to adjust the pH of the solution to a value between about 5 and 7.5. To this solution there is added, with stirring, a metal salt of the group mentioned above. Suitably, at least about 80% of the amount of salt required to react with the molybdenum in the solution is used. During the addition of the metal salt the pH of the solution will fall to about 4 to 5.5. Molybdenum is precipitated as a metal molybdate, but the tungsten remains in solution. The metal molybdate is then separated from solution by filtration. As explained above, this separation is promoted if the starting solution is maintained at a temperature between about 75° C. and its boiling point during the adjustment of its pH and the metal salt addition.

It is important that the pH of the solution be correctly adjusted before the metal salt is added. If the initial pH of the solution is greater than 7.5, tungsten will be co-precipitated with molybdenum upon the addition of the metal salt. If, on the other hand, the initial pH of the solution is below 5, the precipitation of molybdenum will be suppressed. Proper adjustment of the initial pH of the solution to a value between 5 and 7.5 makes possible the recovery of about 85% or more of the molybdenum in the solution without the precipitation of substantial quantities of tungsten when the metal salt is added to the solution.

If the pH of the initial solution containing molybdenum and tungsten compounds is below 5, it may be raised by the addition of an alkali metal compound having a strong basic reaction, such as a carbonate or hydroxide of an alkali metal.

The metal molybdate produced by the process of the invention contains no serious amount of sulfur, a particularly undesirable impurity frequently present in molybdenum compounds. It may be calcined readily to a dust-free product, or it can be smelted to produce ferromolybdenum, or converted, if desired, to calcium molybdate by dissolving it in an aqueous solution of sodium carbonate preferably at a temperature of about 80° C. to 90° C. and treating the resulting solution with a calcium compound such as calcium chloride or lime to precipitate calcium molybdate. Ferrous molybdate produced by the method of the invention may be used for example as a direct addition agent in the manufacture of molybdenum-containing steel.

The process of the invention has been found to be economical and efficient in large scale operations. For example in one operation, 10,000 pounds of a roasted molybdenum-tungsten trisulfide containing about 5% tungsten and about 25% molybdenum were hot digested with 4,600 pounds of sodium carbonate in aqueous solution at a steam pressure of 200 pounds per square inch to produce, upon filtering and removal of insoluble residue, 50,000 pounds of a solution containing about 10 grams per liter of tungsten and 50 grams per liter of molybdenum. This solution was heated and maintained at a temperature between 90° C. and its boiling point, and 2,000 pounds of 94% sulfuric acid were added to adjust the pH of the solution to 7. To the solution, still maintained at a temperature not lower than 90° C., were added 7,000 pounds of commercial ferrous sulfate ($FeSO_4.7H_2O$). The pH of the solution dropped to 4.6 during this addition. Ferrous molybdate was precipitated and was separated from the hot solution by filtration. The ferrous molybdate precipitate so produced was calcined at 750° C. and 5,060 pounds of ferrous molybdate containing 42% molybdenum and only 0.3% tungsten were produced. The sulfur content of this product was 0.03%. The recovery of molybdenum as iron molybdate was 85% of the total molybdenum fed.

The filtrate obtained after filtering and separation of the iron molybdate precipitate was heated to a temperature between 90° C. and its boiling point and 500 pounds of hydrated lime was added. A precipitate containing a mixture of calcium molybdate and calcium tungstate was produced which contained 20% tungsten and 10% molybdenum. This product containing 93% of the total tungsten fed was treated in conventional manner for the recovery of tungsten.

A portion of the iron molybdate produced in the operation just described was converted to calcium molybdate. Thus, 500 parts by weight of iron molybdate were mixed with 800 parts by weight of water and treated for one hour at a temperature of about 80° C. to 90° C. with 175 parts by weight of sodium carbonate. The solution was filtered, and to the filtrate were added 220 parts of calcium chloride, producing a precipitate of calcium molybdate. A recovery of 97.6% of the molybdenum was obtained as calcium molybdate of high purity.

It will be apparent to those skilled in the art that the process of the invention is not limited to the treatment of any particular starting solution. The invention is applicable generally to the treatment of aqueous solutions containing both molybdenum and tungsten compounds, no matter from what source such solutions are obtained.

I claim:

1. Process which comprises adjusting the pH of an aqueous solution containing molybdenum and tungsten compounds to a value between 5 and 7.5 and adding a mineral acid salt selected from the group consisting of sulfate, chloride and nitrate of a divalent metal selected from the group consisting of iron, nickel, cobalt and manganese to the said solution, thereby precipitating a molybdate of the selected metal therefrom without precipitating any substantial quantity of tungsten.

2. Process which comprises adjusting the pH of an aqueous solution containing molybdenum and tungsten compounds to a value between 5 and 7.5 adding to the said solution at least about 80% of the amount of sulfate of a divalent metal selected from the group consisting of iron, cobalt, nickel, and manganese theoretically required to react with all of the molybdenum in the said solution, thereby precipitating substantially all of the molybdenum in said solution as a molybdate of the selected metal without precipitating any substantial quantity of tungsten.

3. Process which comprises adjusting the pH of an aqueous solution containing molybdenum and tungsten compounds to a value between 5 and 7.5 and adding to the said solution an amount of ferrous sulfate at least 80% of that theoretically sufficient to react with all of the molybdenum in the said solution, thereby precipitating substantially all of the molybdenum in said solution as ferrous molybdate without precipitating any substantial quantity of tungsten.

4. Process which comprises adjusting the pH of an aqueous solution containing molybdenum and tungsten compounds to a value of between 5 and 7.5, heating said solution to a temperature between about 75° C. and its boiling point, and adding to the hot solution at least about 80% of the amount of ferrous sulfate sufficient to react with all of the molybdenum in the said solution, thereby precipitating substantially all of the molybdenum in said solution as ferrous molybdate without precipitating any substantial quantity of tungsten.

5. Process of preparing calcium molybdate from an aqueous solution containing both mlybdenum and tungsten compounds which comprises adjusting the pH of a solution containing molybdenum and tungsten compounds to a value between 5 and 7.5, adding ferrous sulfate to the said solution in a quantity at least about 80% of that theoretically sufficient to react with all of the molybdenum in said solution, thereby precipitating substantially all of said molybdenum as ferrous molybdate without precipitating and substantial quantity of tungsten, separating said ferrous molybdate from said solution, dissolving ferrous molybdate in an aqueous solution of an alkali metal compound having a strong basic reaction, and adding a calcuim compound to the solution so prepared, thereby precipitating calcium molybdate substantially free of sulfur therefrom.

6. A method of treating an ore material containing both molybdenum and tungsten compounds to recover a molybdenum compound therefrom, which method comprises digesting such ore material at a steam pressure of about 130 to 200 pounds per square inch with an aqueous solution of an alkali metal having a strong basic reaction, thereby producing an alkaline solution containing both molybdenum and tungsten compounds, adjusting the pH of said solution to a value between 5 and 7.5 by adding a mineral acid thereto, and adding ferrous sulfate to the said solution in an amount at least 80% of that theoretically sufficient to react with all of the molybdenum in said solution, thereby precipitating molybdenum as ferrous molybdate therefrom without precipitating any substantial quantity of tungsten.

MICHAEL C. CAROSELLA.

REFERENCES CITED

The following references are of record in the file of this patent:

UNITED STATES PATENTS

| Number | Name | Date |
|---|---|---|
| 1,250,063 | Westling | Dec. 11, 1917 |
| 1,281,961 | Holladay | Oct. 15, 1918 |
| 1,399,554 | Hamilton | Dec. 6, 1924 |
| 2,079,805 | Judd | May 11, 1937 |
| 2,187,468 | Sullivan et al. | Jan. 16, 1940 |
| 2,339,888 | Smith | Jan. 25, 1944 |
| 2,351,678 | Hall | June 20, 1944 |

Certificate of Correction

February 8, 1949.

Patent No. 2,460,975.

MICHAEL C. CAROSELLA

It is hereby certified that errors appear in the printed specification of the above numbered patent requiring correction as follows:

Column 4, lines 23 and 24, claim 5, for "mlybdenum" read *molybdenum*; line 33, same claim, for the word "and" read *any*; line 35, before "ferrous" insert *said*; line 37, same claim 5, for "calcuim" read *calcium*;

and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*